US005869162A

United States Patent [19]

Traa

[11] Patent Number: 5,869,162

[45] Date of Patent: Feb. 9, 1999

[54] NET COMPOSED OF A NUMBER OF COMPONENT NETS

[76] Inventor: Josephus Michael Anthonius Traa, Marconiestraat 16a, NL-2181 AK Hillegom, Netherlands

[21] Appl. No.: 802,110

[22] Filed: Feb. 19, 1997

Related U.S. Application Data

[63] Continuation-in-part of Ser. No. 750,224, filed as PCT/NL95/00176 May 17, 1995, abandoned.

[30] Foreign Application Priority Data

May 26, 1994 [NL] Netherlands ............................ 940086

[51] Int. Cl.[6] ............................ B32B 3/00; B32B 23/02

[52] U.S. Cl. ............................ 428/58; 428/193; 442/1; 294/77

[58] Field of Search ............................ 442/1; 294/77; 428/58, 193

[56] References Cited

U.S. PATENT DOCUMENTS

| | | | |
|---|---|---|---|
| 1,365,511 | 1/1921 | Lee | 294/77 |
| 3,961,585 | 6/1976 | Brewer | 294/77 |
| 4,000,344 | 12/1976 | Dilbey | 87/12 |
| 4,892,210 | 1/1990 | Kupersmit | 294/77 |

*Primary Examiner*—Terrel Morris
*Attorney, Agent, or Firm*—Young & Thompson

[57] ABSTRACT

Net which, in the unfolded state, has the form of a central part provided at the petrify with a number of flaps. Nets of this type are used to fix articles on pallets. The flaps in particular are subject to substantial loads and will frequently be damaged. So as to avoid the need to carry out extensive repair work on the net structure, it is proposed, according to the invention, to construct the net from various component nets. The production of the nets can likewise be facilitated in this way.

13 Claims, 4 Drawing Sheets

NET COMPOSED OF A NUMBER OF COMPONENT NETS

This application is a continuation-in-part of Ser. No. 08/750,224 filed Nov. 26, 1996, now abandoned, which was a continuation of international application PCT/NL95/00176 filed May 17, 1995, which designated the United States.

FIELD OF THE INVENTION

The present invention relates to a net having a central part provided at its periphery with a number of flaps.

BACKGROUND ART

A net of this type is generally known in the prior art. Especially for air freight, articles are placed on, for example, aluminium pallets and held in place with the aid of a net. To this end, the pallet is provided with recesses at the edges, in which recesses fastenings, which are fixed to the four corners of the net, can be anchored. Rubbing against adjacent pallets leads to a relatively short life of the flaps, in particular in the vicinity of the point of fixing to the pallet.

Because nets of this type are fairly expensive—these nets are made, inter alia, of polyethene cord and are made by hand—such nets will be repaired in practice.

Nevertheless, at least 100,000 nets per year are consumed by the various airlines.

Because a net consists of a single thread which has been turned into a network with the aid of knot constructions, it will be understood that it is not easily possible to repair part of the net without this having serious consequences for all of the constructions of the net. An example of the construction of a net described above is found in U.S. Pat. No. 4,000,344.

German Offenlegungsschrift 2,907,683 discloses a net which can be fixed to other nets with the aid of chains. A construction of this type is expensive. Moreover, there is a risk of damage to the load by the chains and it is not guaranteed that there is adequate grip on the load at the location of the chains.

U.S. Pat. No. 4,000,344 proposes to form a net having a central panel and a plurality of wing sections being connected thereto. After connecting a central panel and the wing sections a circumferential strand is passed around the assembly of central panel and wing sections. Because of that it is impossible to replace parts of the net without disturbing the structure of the net assembly.

SUMMARY OF THE INVENTION

The aim of the present invention is to enable the nets described in U.S. Pat. No. 4,000,344 to be produced more simply and repaired more easily.

According to one aspect of the invention this is realized in a net having a central part provided at its periphery with a number of flaps, each of the flaps being a separate component connected to the central part by attaching means, the attaching means comprising a number of free ending strand portion of the flaps, a strand portion extending from each peripheral intersection of peripheral meshes of the related flap, at least one free end of two adjacent strand portions being threaded through a peripheral mesh of the central part and connected to the free end of the other of the two adjacent strand portions.

As a result of the presence of various component nets, it is possible, according to the invention, in the event of damage to one of the component nets to replace only that component net. By constructing the component nets in such a way that said component nets consist of simple, rectangular shapes, the component nets can be produced by machine, as a result of which the production costs can be reduced. By use of the strands it is possible to obtain the mesh structure which does not deviate in an adverse manner from the other meshes of the component nets and which has all the characteristics of the component nets. It is an inexpensive solution which will be acceptable to all users immediately because its freight-holding characteristics are unchanged.

It is possible to realize the free ends with equal length so that their connection is at the strand and more particular a knot of the central part. It is is even feasible if knotting is used to interweave free ends with the strands of the central part.

According to a preferred embodiment optimum strength of the connection is realized if a knot is used comprising the provision of a hole in the body of one strand near its extremity the provision of a further hole near the free extremity of the other strand, and to thread free extremities beyond the holes in the hole of the other of the strands. It has been shown during testing of a net assembly so obtained that the failure strength is not determined by the strength of the connection between the two free strength ends but is only dependent on the strength of the strands material used. This knot is as such known from U.S. Pat. No. 4,000,344 referred to above.

According to a further preferred embodiment the ends of the flap nets to be joined to one of the central parts comprise points of the meshes of the adjacent nets which are joined horizontally offset with respect to one another in such a way that meshes which correspond to the meshes of the component nets are produced between the strand ends connected to each other. In this way a continuous pattern of meshes is obtained. It is possible to provide free ending strands of the flaps with a different color so that after their connection it is immediate clear where to cut the flap from the central part in case of damage. If such damage occurs it is easy to replace the related flap by a new one. Furthermore this makes it possible to provide coding for different airlines or to indicate different purposes for the nets and, on the other hand, this forms an indication of the place where these strands are located. The cargo nets to which the present invention relates are, after all, relatively large and will rarely be able to be spread out flat. It has been found that it is then particularly difficult to differentiate the boundary between various component nets. By giving the strands a different color (for example throughout or by incorporating an auxiliary strand of different color) or a different shape or constructing said strands with some other differentiating means, these strands can easily be found and the net can be recognized.

The invention will be explained in more detail below with the aid of a number of illustrative embodiments shown in the drawing. In the drawing:

DETAILED DESCRIPTION OF THE INVENTION

Figure 1:
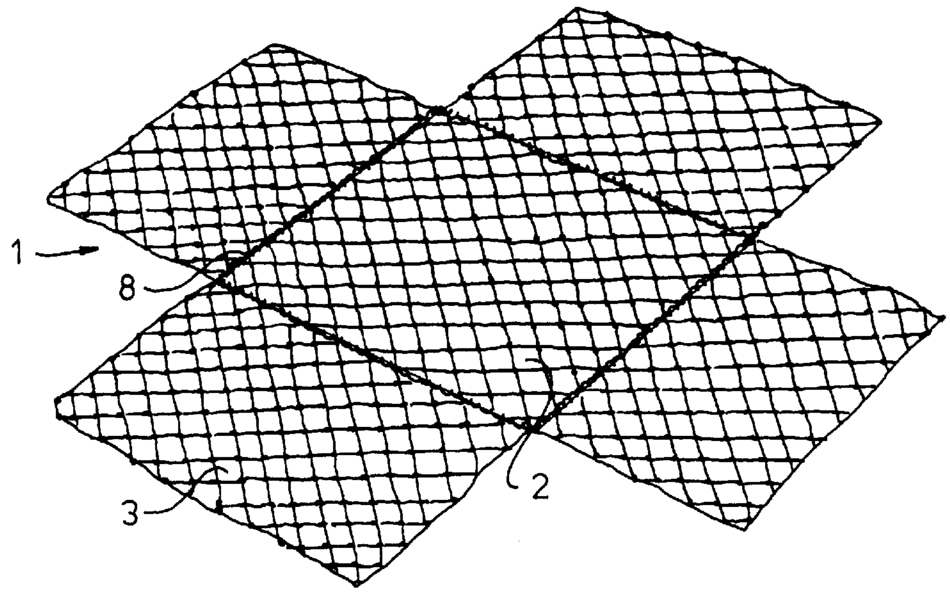
FIG. 1 shows the general construction of a net according to the invention, the production in component nets according to a first variant being indicated.

In FIG. 1 the net according to the invention is indicated in its entirety by 1. The shape of a net of this type is generally known from the prior art. It is composed of a central part 2 with a number of flaps 3 adjoining said central part. The free ends of the flaps 3 must be fixed to a pallet. These flaps 3, in particular, are subjected to severe stresses, especially at the free outer edges thereof, and will be the first to fail.

According to the invention, it is proposed, in a first embodiment, to construct the central part 2 and the flaps 3 from individual parts and to fix these parts to one another at a boundary by means of an end strand, which is present in both component nets, for example by threading a connecting strand 8.

The material from which the nets are constructed can be polyethene cord. An approximately 800 m strand is needed for a net customary for air freight. If threading is effected by a particular method, such as, for example, is disclosed in U.S. Pat. No. 4,000,344, this signifies that a long length of strand has to be threaded through "itself". With the aid of the invention, the advantage is obtained that the length of the strand from which the net is constructed can be appreciably shortened, for example down to 150 m, as a result of which the production of particular interweaving can be simplified and the production time shortened. If the net according to FIG. 1 is damaged, in particular at one of the flaps 3, the connection between the adjacent end strands, by means of connecting strand 8, of component net 3 and central part 2 is simply broken and a new component net 3 is positioned against the central part and fixed thereto again in the original manner.

The net is also constructed in this way during production thereof.

Figure 2:
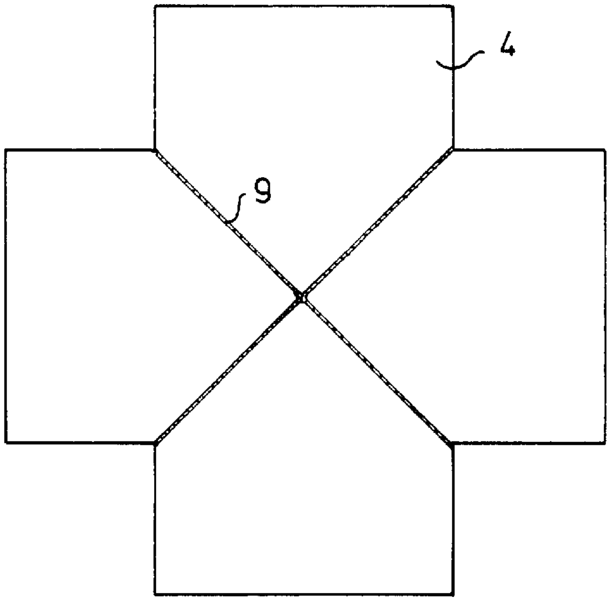
FIG. 2 shows, diagrammatically, the construction of a second variant.

FIG. 2 shows a further alternative embodiment, wherein each component net comprises a flap and part of the central part. These parts are joined to one another along a diagonal line 9.

Figure 3:
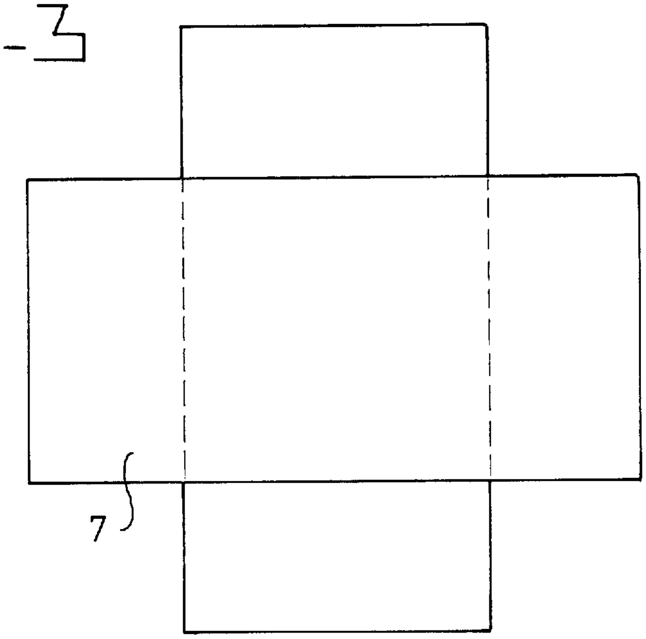
FIG. 3 shows, diagrammatically, the construction of a third variant.

FIG. 3 shows an embodiment wherein the component nets are all of the same shape. In this case the component nets 7 cross one another so that a strengthened central part is obtained.

Figure 4:
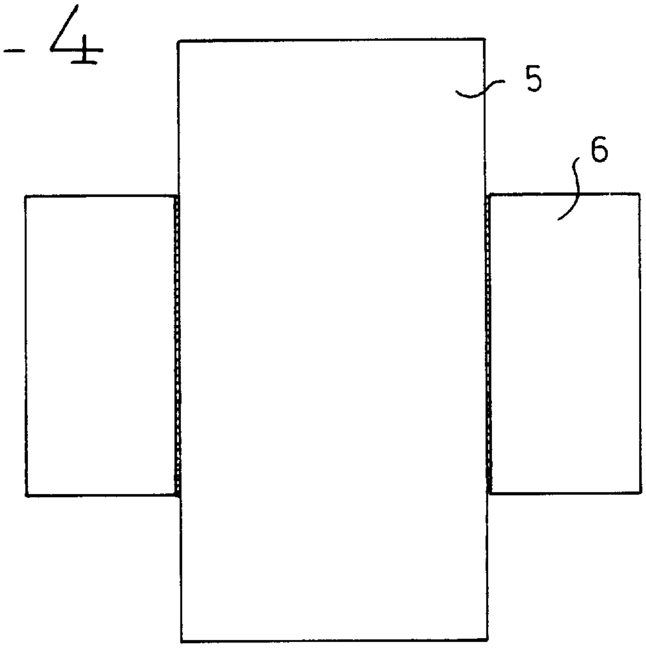
FIG. 4 shows, diagrammatically, the construction of a fourth variant according to the invention.

FIG. 4 shows an embodiment wherein a component net is of elongated rectangular construction and is indicated by 5, which component net comprises not only both opposing flaps but also the central part. Two component nets 6, which comprise the flaps only, are arranged adjoining said component net 5.

Figure 5:
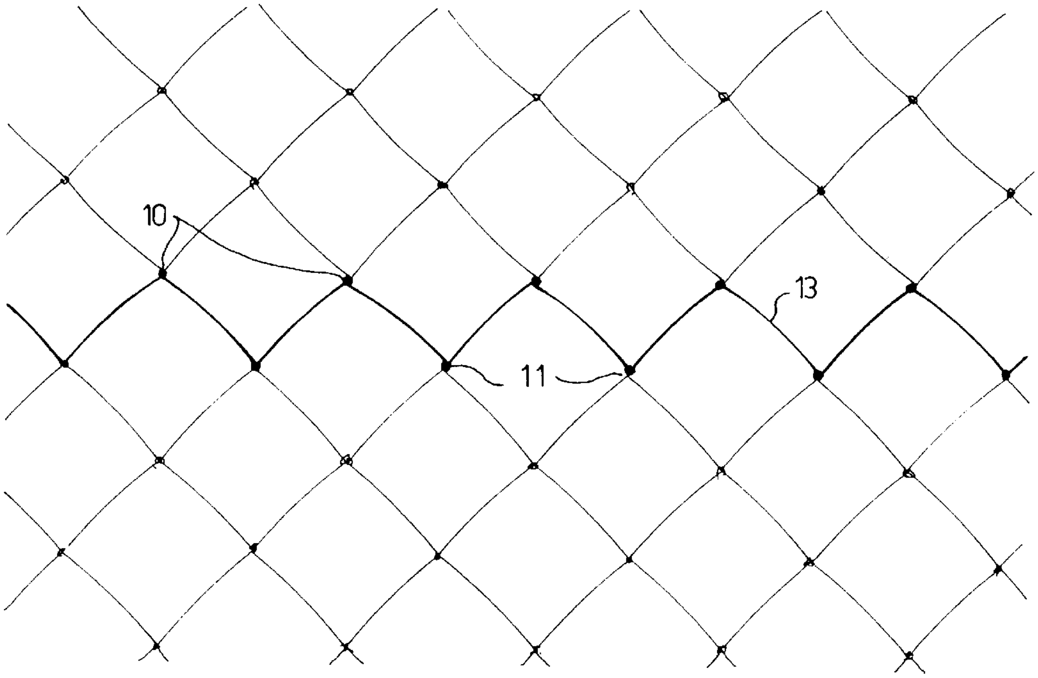
FIG. 5 shows a detail of the further construction of the joint between two component nets according to the invention.

FIG. 5 shows a further embodiment of the connection between two component nets, on an enlarged scale.

Figure 6:
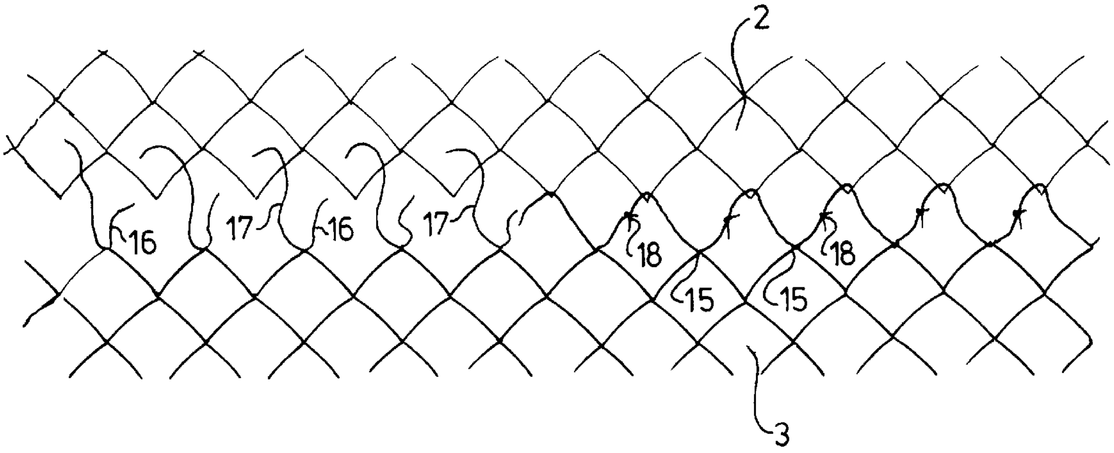
FIG. 6 shows a further preferred embodiment of a joint between a flap and central part.

In FIG. 6 details are given for the connection of two adjacent component nets. The periphery of central part 2 and flap 3 are shown in detail. From the points defining the extremities of the meshes of flaps 3 indicated by 15 two strands 16, 17 extend. Strand 17 is relatively long whilst strand 16 is relatively short. Strand 17 is threaded around the opposite periphery mesh of central part 2 and connected to the relatively short strand 16 extending from adjacent point 15. The connection is referred to by 18 and shown in more detail in FIG. 7. It will be seen that in this way meshes of flaps 3 engage the extremity of the related peripheral mesh of central part 2.

Figure 7:
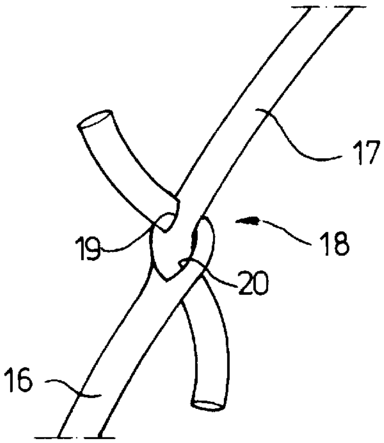
FIG. 7 shows a detail of FIG. 6 after connection of the free strand ends.

From FIG. 7 it is clear that in the body of strand 17 an opening 19 is provided. This opening 19 is realized near the free extremity of strand 17. The same applies for strand 16 which is provided with opening 20 near its free extremities and the free end of strand 17 beyond opening 19 is introduced through opening 20 whilst the free end of strand 16 beyond opening 20 is introduced in opening 19. After exerting a pull force on strands 16, 17 a knot is obtained having a strength comparable with the strength of material of strands 16 and 17.

It will be understood that many other alternative embodiments fall within the scope of the present application.

Fixing of two adjacent component nets does not necessarily have to be effected with the aid of threading. Other methods of fixing, such as by means of clamps or other fastenings, are possible. The material from which the nets are produced can be any material known from the prior art, such as flame-retardant, woven or made rope or knitted materials. After reading the appended claims, all these embodiments will be obvious to those skilled in the art.

I claim:

1. A net comprising:

a central part having a first peripheral mesh; and a flap separate from said central part, said flap having a second mesh along one side and plural first and plural second strands extending from said second mesh, a free end of each of said first strands being threaded through said first peripheral mesh and connected to a free end of an adjacent one of said second strands.

2. The net according to claim 1, wherein said first strands are longer than said second strands.

3. The net according to claim 1, wherein said free ends of said first and second strands are knotted.

4. The net according to claim 3, wherein each of said free ends includes a terminal and defines a hole, said terminal of each of said first strands being inserted into said hole of said adjacent one of said second strands, said terminal of each of said second strands being inserted into said hole of an adjacent one of said first strands.

5. The net according to claim 1, wherein the connected ones of said first and second strands create a continuous mesh between said first and second meshes.

6. A net comprising:

a plurality of flaps, each flap of said plurality of flaps including an edge mesh and plural first and plural second strands extending from a portion of each of said edge meshes, a free end of each of said first strands being threaded through said edge mesh of an adjacent said flap of said plurality of flaps and connected to a free end of an adjacent one of said second strands of said each flap of said plurality of flaps.

7. The net according to claim 6, wherein said first strands are longer than said second strands.

8. The net according to claim 6, wherein said fee ends of said first and second strands are knotted.

9. The net according to claim 3, wherein each of said free ends includes a terminal and defines a hole, said terminal of each of said first strands being inserted into said hole of said adjacent one of said second strands, said terminal of each of said second strands being inserted into said hole of an adjacent one of said first strands.

10. The net according to claim 6, wherein said connected ones of said first and second strands create a continuous mesh between said each flap of said plurality of flaps and said adjacent said flap of said plurality of flaps.

11. A net comprising:

a first net portion including a first mesh;

a second net portion including a second mesh; and plural first and plural second strands extending from one of said first and second meshes, a free end of each of said first strands being threaded through another of said first and second meshes and connected to a free end of an adjacent one of said second strands.

12. The net according to claim 11, wherein each of said free ends includes a terminal and defines a hole, said terminal of each of said first strands being inserted into said hole of said adjacent one of said second strands, said terminal of each of said second strands being inserted into said hole of an adjacent one of said first strands.

13. The net according to claim 11, wherein the connected ones of said first and second strands create a continuous mesh between said first and second meshes.

* * * * *